(12) United States Patent
Sakaguchi et al.

(10) Patent No.: US 7,082,936 B2
(45) Date of Patent: Aug. 1, 2006

(54) INTERNAL COMBUSTION ENGINE CONTROL DEVICE

(75) Inventors: Shigeyuki Sakaguchi, Yokohama (JP); Yoichiro Nakahara, Inagi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/126,144

(22) Filed: May 11, 2005

(65) Prior Publication Data

US 2006/0016441 A1    Jan. 26, 2006

(30) Foreign Application Priority Data

Jul. 23, 2004    (JP)    ............... 2004-215105

(51) Int. Cl.
*F02D 41/22*    (2006.01)
*G01M 15/10*    (2006.01)

(52) U.S. Cl. .................... 123/688; 123/399

(58) Field of Classification Search ........... 123/399, 123/443, 672, 675, 682, 688, 693, 698–699, 123/325–327, 330; 701/103, 109–110; 60/276–277, 60/285

See application file for complete search history.

(56) References Cited

U.S. PATENT DOCUMENTS

| 4,782,690 | A | * | 11/1988 | Terasaka ............... 73/116 |
| 5,040,505 | A | | 8/1991 | Toyoda |
| 5,672,817 | A | * | 9/1997 | Sagisaka et al. ........ 73/118.1 |
| 5,813,386 | A | * | 9/1998 | Okada et al. .......... 123/339.14 |
| 5,845,489 | A | * | 12/1998 | Dohta et al. ............ 60/276 |
| 5,934,247 | A | | 8/1999 | Hashimoto et al. |
| 6,026,794 | A | * | 2/2000 | Kadowaki et al. ........ 123/674 |
| 6,136,169 | A | * | 10/2000 | Okamoto ............... 204/401 |
| 6,644,270 | B1 | * | 11/2003 | Fujieda et al. .......... 123/305 |
| 6,829,886 | B1 | * | 12/2004 | Nakata ................ 60/277 |

FOREIGN PATENT DOCUMENTS

| JP | S60-111051 | | 6/1985 |
| JP | 62-17331 | * | 1/1987 |
| JP | 62-186029 | * | 8/1987 |
| JP | 62-248845 | * | 10/1987 |
| JP | 9-280086 | * | 10/1997 |
| JP | 10-26042 | * | 1/1998 |
| JP | 2000-220493 A | | 8/2000 |

* cited by examiner

*Primary Examiner*—Hai Huynh
(74) *Attorney, Agent, or Firm*—Shinjyu Global IP Counselors

(57) ABSTRACT

An engine control device is configured to prevent a rotational speed of a vehicle engine from becoming abnormally low during deceleration due to an abnormal air-fuel ratio. When conditions for feedback control of engine idle speed are not satisfied and self diagnosis results of the air-fuel ratio control system are normal, the control device determines if the air-fuel ratio is in an abnormally lean state. The control device then determines if the abnormally lean air-fuel ratio state has continued without interruption for a prescribed period or longer. If so, the control device calculates an air-fuel ratio abnormality compensation quantity, e.g., adds an air-fuel ratio abnormality compensation value to an idle compensation air quantity, to increase the intake air quantity and compensate for the engine torque deficiency resulting from the lean air-fuel ratio state.

16 Claims, 5 Drawing Sheets

INTERNAL COMBUSTION ENGINE CONTROL DEVICE

CROSS-REFERENCE TO RELATED APPLICATIONS

This application claims priority to Japanese Patent Application No. 2004-215105. The entire disclosure of Japanese Patent Application No. 2004-215105 is hereby incorporated herein by reference.

BACKGROUND OF THE INVENTION

1. Field of the Invention

The present invention relates to an engine control device for an internal combustion engine. More specifically, the present invention relates to engine control technology for revising an intake air quantity of an internal combustion engine based on an air-fuel ratio of the internal combustion engine.

2. Background Information

One example of an intake air quantity control device is disclosed in Japanese Laid-Open Patent Publication No. 2000-220493. In this publication, an intake air quantity control device is configured to revise an intake air control quantity in such a manner that when the target air-fuel ratio for the internal combustion engine is set to a lean value, then as the target air-fuel ratio becomes leaner the amount of the intake air quantity is increased to a greater extent.

In view of the above, it will be apparent to those skilled in the art from this disclosure that there exists a need for an improved engine control device. This invention addresses this need in the art as well as other needs, which will become apparent to those skilled in the art from this disclosure.

SUMMARY OF THE INVENTION

It has been discovered that, in the technology disclosed in the aforementioned publication, the intake air quantity control device is not configured to compensate for a torque deficiency that results when the actual air-fuel ratio is leaner than the target air-fuel ratio. Consequently, when, for example, the engine is operating in a state where the actual air-fuel ratio is leaner than the target air-fuel ratio due to a poor connection or other some problem in a fuel supply system or an intake air metering system and the vehicle is decelerated in a manner leading to engine idling (e.g., by operating a brake to stop the vehicle), then the feedback control of the idle speed of the engine will not be fast enough to prevent the engine rotational speed from becoming abnormally low due to insufficient torque. In the worst case, this situation could result in the engine stalling.

If the intake air quantity supplied during deceleration is increased in advance in anticipation of an abnormal air-fuel ratio, then the intake air quantity will become excessive and the fuel efficiency will decline in cases where the air-fuel ratio is normal at the time of deceleration.

The present invention was conceived in view of the problems described above. One object of the present invention is to provide an internal combustion engine control device that can avoid degrading the fuel efficiency when the air-fuel ratio is normal and can prevent the rotational speed of the engine from becoming abnormally low when the air-fuel ratio is abnormal.

In order to achieve the above object, an internal combustion engine control device is provided that basically comprises an abnormal air-fuel ratio determining section and an intake air quantity compensating section. The abnormal air-fuel ratio determining section is configured to detect if an air-fuel ratio of an internal combustion engine is abnormal. The intake air quantity compensating section is configured to revise an intake air quantity supplied to the internal combustion engine during deceleration to a larger quantity upon determining that the air-fuel ratio is abnormal.

These and other objects, features, aspects and advantages of the present invention will become apparent to those skilled in the art from the following detailed descriptions, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
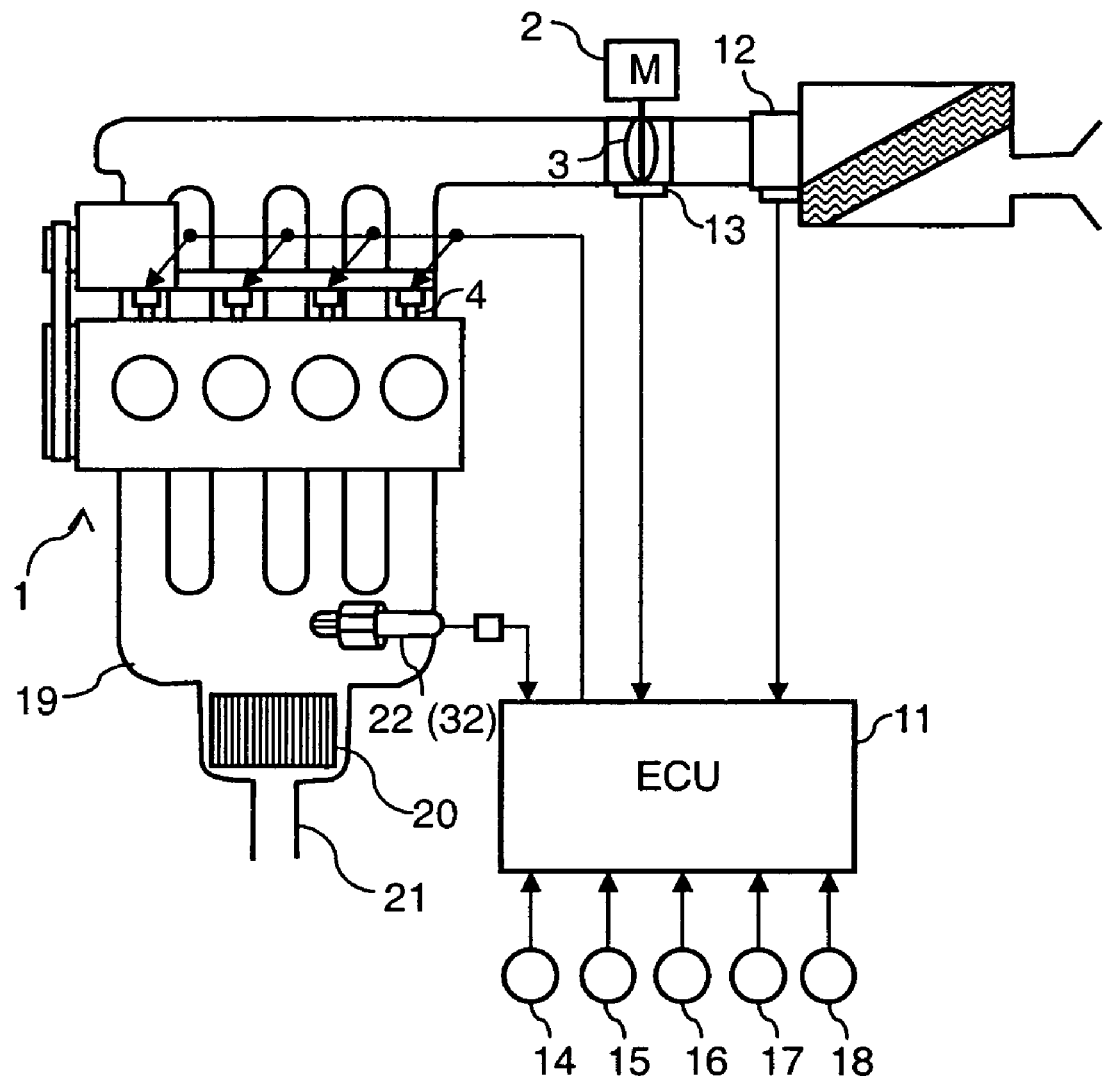
FIG. 1 is a simplified overall schematic view of an internal combustion engine provided with an engine control device or unit configured and programmed for regulating an intake air quantity in accordance with preferred embodiments of the present invention.

Referring initially to FIG. 1, a simplified overall schematic view of an internal combustion engine 1 is illustrated that is equipped to regulate an intake air quantity in accordance with preferred embodiments of the present invention. As shown in FIG. 1, the internal combustion engine 1 is preferably a gasoline engine that is provided with a throttle motor 2 that operates a throttle valve 3 and a plurality of fuel injection valves 4 (one for each cylinder). As typically occurring in engines, intake air is drawn into the engine 1 through the throttle valve 3 and fuel is injected into the combustion chamber of each cylinder from the corresponding fuel injection valve 4. The air and fuel mix together in the combustion chamber of each cylinder to form an air-fuel mixture. The air-fuel mixture is ignited by a spark plug (not shown) and the resulting combustion or explosion of the air-fuel mixture causes a piston 4 (one for each cylinder) to move reciprocally, thereby providing a drive force for a vehicle in a conventional manner.

The internal combustion engine 1 is further provided with an engine control unit (ECU) or device 11 that controls the throttle valve 3 (intake air quantity) and the fuel injection valves 4 (fuel injection quantity). As explained below, the engine control unit (ECU) 11 is configured and programmed to revise the intake air quantity supplied to the internal combustion engine during deceleration to a larger quantity when the air-fuel ratio is abnormal. By revising the intake air quantity supplied to the internal combustion engine 1 during deceleration to a larger quantity when the air-fuel ratio is abnormal, the amount by which the torque declines due to the air-fuel ratio abnormality (i.e., due to the divergence of the air-fuel ratio to a value leaner than the target air-fuel ratio) can be compensated for and the engine rotational speed can be prevented from becoming abnormally low in the event that the vehicle is decelerated in a manner leading to engine idling. Since the intake air quantity supplied to the engine 1 during deceleration is only revised when the air-fuel ratio is abnormal, the fuel efficiency performance is not affected by unnecessary revisions of the intake air quantity executed when the air-fuel ratio is normal.

The engine control unit 11 preferably includes a built-in microcomputer with an intake air quantity control program that controls the throttle valve 3, as discussed below, and a fuel injection quantity control program that controls the fuel injection valves 4. The control unit 11 can also include other conventional components such as an input interface circuit, an output interface circuit, and storage devices such as a ROM (Read Only Memory) device and a RAM (Random Access Memory) device. The memory circuit stores processing results and control programs such as ones for operating the throttle valve 3 and the fuel injection valves 4. The internal RAM of the engine control unit 11 stores statuses of operational flags and various control data. The internal ROM of the engine control unit 11 stores the operational parameters for controlling the various operations of the throttle valve 3 and the fuel injection valves 4. It will be apparent to those skilled in the art from this disclosure that the precise structure and algorithms for the engine control unit 11 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 11 is operatively coupled to various sensors in a conventional manner to receive detection signals from various sensors. Based on these detection signals, the engine control unit 11 is configured or programmed to control the throttle valve 3 and the fuel injection valves 4. In particular, based on the detection signals, the engine control unit 11 computes control signals for the throttle motor 2 and the fuel injection valves 4 and then sends the control signals to operate the throttle motor 2 and the fuel injection valves 4.

More specifically, the engine control unit 11 is configured to receive various input signals from the following devices or sensors: an air flow meter 12, a throttle sensor 13, a rotational speed sensor 14, a coolant sensor 15, a neutral switch 16, an idle switch 17 and a vehicle speed sensor 18. The sensors 12–18 are conventional components that are well known in the art. Since the sensors 12–18 are well known in the art, these structures will not be discussed or illustrated in detail herein. Rather, it will be apparent to those skilled in the art from this disclosure that the sensors 12–18 can be any type of sensor, structure and/or programming that can be used to carry out the present invention.

The air flow meter 12 is configured and arranged to detect the intake air quantity of the engine 1 at a position upstream of the throttle valve 3. Thus, the intake air quantity is detected by the air flow meter 12, which outputs a detection signal to the engine control unit 11 that is indicative of the intake air quantity being delivered to the combustion chambers of the engine 1. The throttle sensor 13 is configured and arranged to detect an opening degree of the throttle valve 3. Thus, the throttle position or opening amount of the throttle valve 3 is detected by the throttle sensor 13, which outputs a detection signal to the engine control unit 11 that is indicative of the throttle position or opening amount of the throttle valve 3. The rotational speed sensor 14 is configured and arranged to detect the rotational speed of the engine 1, e.g., by detecting the crank angle of the crank shaft of the engine 1. Thus, the engine rotational speed is detected by the rotational speed sensor 14, which outputs a detection signal to the engine control unit 11 that is indicative of the engine rotational speed. The coolant sensor 15 is configured and arranged to detect the temperature of the coolant in the engine 1. Thus, the temperature of the coolant in the engine 1 is detected by the coolant sensor 15, which outputs a detection signal to the engine control unit 11 that is indicative of the temperature of the coolant in the engine 1. The neutral switch 16 is configured and arranged to detect if the transmission (not shown in the figures) used in combination with the engine 1 is in neutral (neutral shift position). Thus, the neutral position or state of the transmission is detected by the neutral switch 16, which outputs a detection signal to the engine control unit 11 that is indicative of the neutral position or state of the transmission. The idle switch 17 is configured and arranged to detect if the engine 1 is in an idling state (e.g., accelerator fully released). Thus, the idling state of the engine 1 is detected by the idle switch 17, which outputs a detection signal to the engine control unit 11 that is indicative of the idling sate of the engine 1. The vehicle speed sensor 18 is configured and arranged to detect the traveling speed (vehicle speed) of the vehicle in which the engine 1 is installed. Thus, the traveling speed (vehicle speed) of the vehicle is detected by the vehicle speed sensor 18, which outputs a detection signal to the engine control unit 11 that is indicative of the traveling speed (vehicle speed) of the vehicle.

An exhaust system of the engine 1 preferably includes, among other things, an exhaust manifold 19 and a catalytic converter 20 disposed in an exhaust passage 21 extending from the exhaust manifold 19. An oxygen sensor 22 is disposed in the exhaust manifold 19 or in the exhaust passage 21 at a position upstream of the catalytic converter 20. The oxygen sensor 22 is configured and arranged to detect whether the actual air-fuel ratio is rich or lean in comparison with a theoretical or stoichiometric air-fuel ratio based on an oxygen concentration of the exhaust gas upstream of the catalytic converter 20.

Instead of using an oxygen sensor 22 that indicates richness or leanness as the sensor or device for detecting the air-fuel ratio, it is also acceptable to use an air-fuel ratio sensor 32 that can detect a wide range of air-fuel ratios. When the air-fuel ratio sensor 32 is provided, the divergence of the air-fuel ratio from the target air-fuel ratio can be measured directly. As a result, the intake air quantity can be revised (increased) by an appropriate quantity based on the amount of divergence of the air-fuel ratio.

The engine control unit 11 is further provided with an idle speed control component or section. The idle speed control section of the engine control unit 11 is configured or programmed to feedback-control the opening degree of the throttle valve 3 (i.e., feedback-control the intake air quantity supplied to the engine 1 during idling) such that when the engine 1 is idling, the actual engine rotational speed is matched to a target idle speed set based on the coolant temperature and other factors.

The engine control unit 11 is also provided with an air-fuel ratio revising component or section. The air-fuel ratio revising section of the engine control unit 11 is configured or programmed to feedback-control the actual air-fuel ratio to a target air-fuel ratio (theoretical air-fuel ratio) based on the detection result obtained with the oxygen sensor 22 or the air-fuel ratio sensor 32.

More specifically, the engine control unit 11 uses the output of the oxygen sensor 22 to determine if the actual air-fuel ratio is rich or lean with respect to a theoretical air-fuel ratio. Using a proportional-integral algorithm based on the result of the determination (rich or lean), the engine control unit 11 computes an air-fuel ratio feedback revision coefficient (default value=1.0). Meanwhile, the engine control unit 11 learns about the revisions based on the air-fuel ratio feedback revision coefficient that have been required in each of a plurality of engine operating regions. The engine control unit 11 stores what it learns in the form of air-fuel ratio learning revision values, and then the engine control unit 11 matches the actual air-fuel ratio to the theoretical air-fuel ratio by revising the fuel injection quantity based on a value equal to the sum of the air-fuel ratio feedback revision coefficient and an air-fuel ratio learning revision value.

Additionally, the engine control unit 11 is provided with an intake air quantity compensating (revising) component or section. The intake air quantity compensating section of the engine control unit 11 is configured or programmed to revise the intake air quantity to a larger quantity when the air-fuel ratio is abnormally lean so that the engine 1 will not stall even if the vehicle is decelerated in a manner leading to engine idling. This intake air quantity compensating component or section will now be explained with reference to the flowchart shown in FIG. 2.

Figure 2:
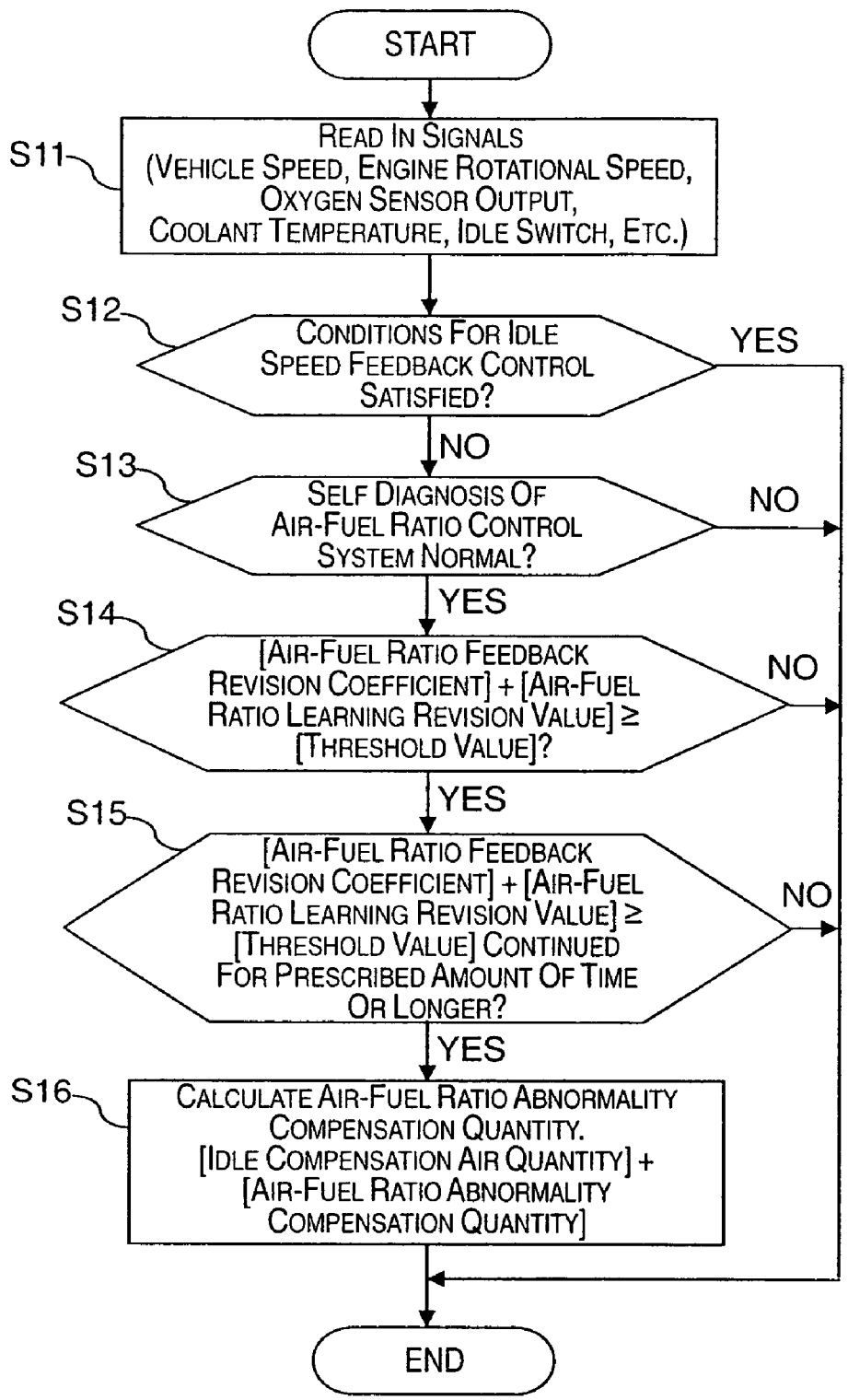
FIG. 2 is a flowchart of an intake air quantity compensating routine executed by the control device to detect if the air-fuel ratio is abnormally lean using an oxygen sensor and then revising the intake air quantity to a larger quantity when the air-fuel ratio is abnormal in accordance with the present invention.

In step S11 of the flowchart shown in FIG. 2, the engine control unit 11 is configured and programmed to read various input signals indicating the vehicle speed, the engine rotational speed, the output of the oxygen sensor, the coolant temperature, the state of the idle switch, etc. from the sensors 14–18 and 22.

In step S12, the engine control unit 11 is configured and programmed to determine if the conditions for feedback control of the idle speed are satisfied. Feedback control of the idle speed is executed when the accelerator pedal is fully released and either the transmission is in a neutral state or the vehicle speed is at or below a prescribed speed. Thus, step S12 of the control routine performed by the engine control unit 11 constitutes an idle speed feedback control section that determines if the conditions for feedback control of the idle speed are satisfied.

If the torque produced by the engine 1 decreases due to divergence of the air-fuel ratio to a value leaner than the target air-fuel ratio and the decrease in torque causes the rotational speed of the engine 1 to decline while the engine 1 is in an idling state in which feedback control of the idle speed is executed, then the engine control unit 11 will execute control to increase the intake air quantity so as to curb the decline in the rotational speed of the engine 1. Consequently, there is no need for a separate revision of the intake air quantity to a larger quantity.

Therefore, if the engine control unit 11 determines in step S12 that the conditions for feedback control of the idle speed are satisfied, then the engine control unit 11 ends the routine without executing any subsequent steps. Meanwhile, if the engine control unit 11 determines in step S12 that the conditions for feedback control of the idle speed are not satisfied, then the engine control unit 11 proceeds to step S13.

Figure 4:
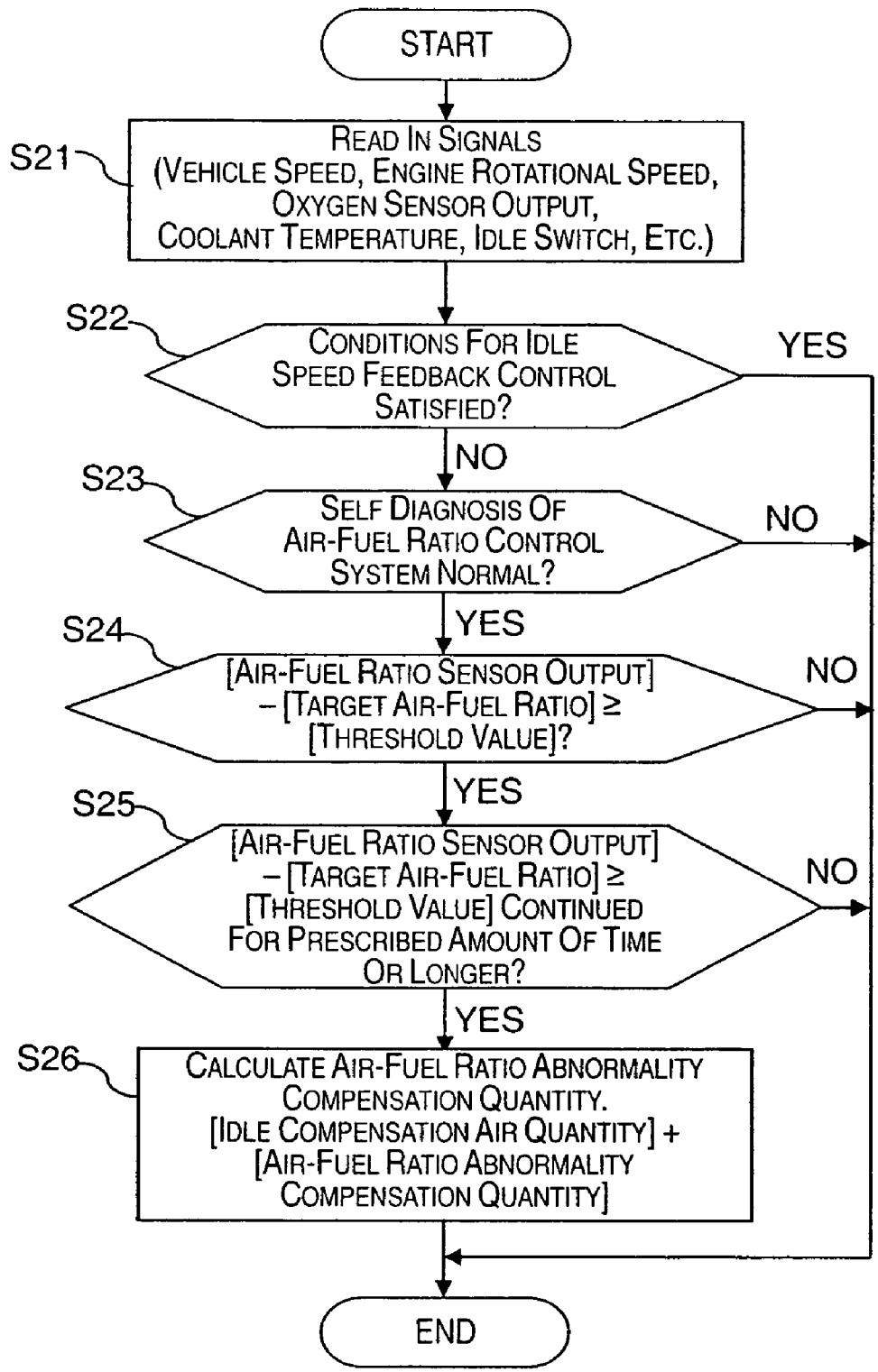
FIG. 4 is a flowchart showing an intake air quantity compensating routine executed by the control device to detect if the air-fuel ratio is abnormally lean using an air-fuel ratio sensor and then revising the intake air quantity to a larger quantity when the air-fuel ratio is abnormal in accordance with the present invention.

In step S13, the engine control unit 11 is configured and programmed to determine if the result of a self diagnosis of an air-fuel ratio control system is normal or not. The air-fuel ratio control system that uses the control routine of FIG. 2 is a system that includes the oxygen sensor 22, while the air-fuel ratio control system that uses the control routine of FIG. 4 is a system that includes the air-fuel ratio sensor 32. If there is a problem with the air-fuel ratio control system, it will not be possible to accurately determine if the air-fuel ratio is abnormally lean.

If the engine control unit 11 determines in step S13 that the result of the self diagnosis of the air-fuel ratio control system is abnormal, the engine control unit 11 ends the routine without executing any subsequent steps. If the air-fuel ratio control system is normal, then the engine control unit 11 proceeds to step S14.

In step S14, the engine control unit 11 is configured and programmed to determine if the sum of the air-fuel ratio feedback revision coefficient (average value) calculated based on the output of the oxygen sensor 22 and the air-fuel ratio learning revision value is equal to or above a threshold value (e.g., 1.25). This sum of the air-fuel ratio feedback revision coefficient (average value) and the air-fuel ratio learning revision value indicates the amount by which the fuel injection quantity needs to be revised towards a target air-fuel ratio. Thus, step S14 of the control routine performed by the engine control unit 11 constitutes a fuel injection quantity revising section that revises the fuel injection quantity such that a detected air-fuel ratio of the internal combustion engine matches a target air-fuel ratio.

Under normal circumstances, when the air-fuel ratio detected with the oxygen sensor 22 is leaner than the target air-fuel ratio, the engine control unit 11 increases the fuel injection quantity by gradually increasing the air-fuel ratio feedback revision coefficient, thereby attempting to rectify the lean state of the air-fuel ratio. Meanwhile, if the sum of the air-fuel ratio feedback revision coefficient and the air-fuel ratio learning revision value is equal to or above the threshold value, then the base air-fuel ratio that would exist if the fuel injection quantity were not revised based on the air-fuel ratio feedback revision coefficient and the air-fuel ratio learning revision value is significantly leaner than the target air-fuel ratio.

Figure 3:
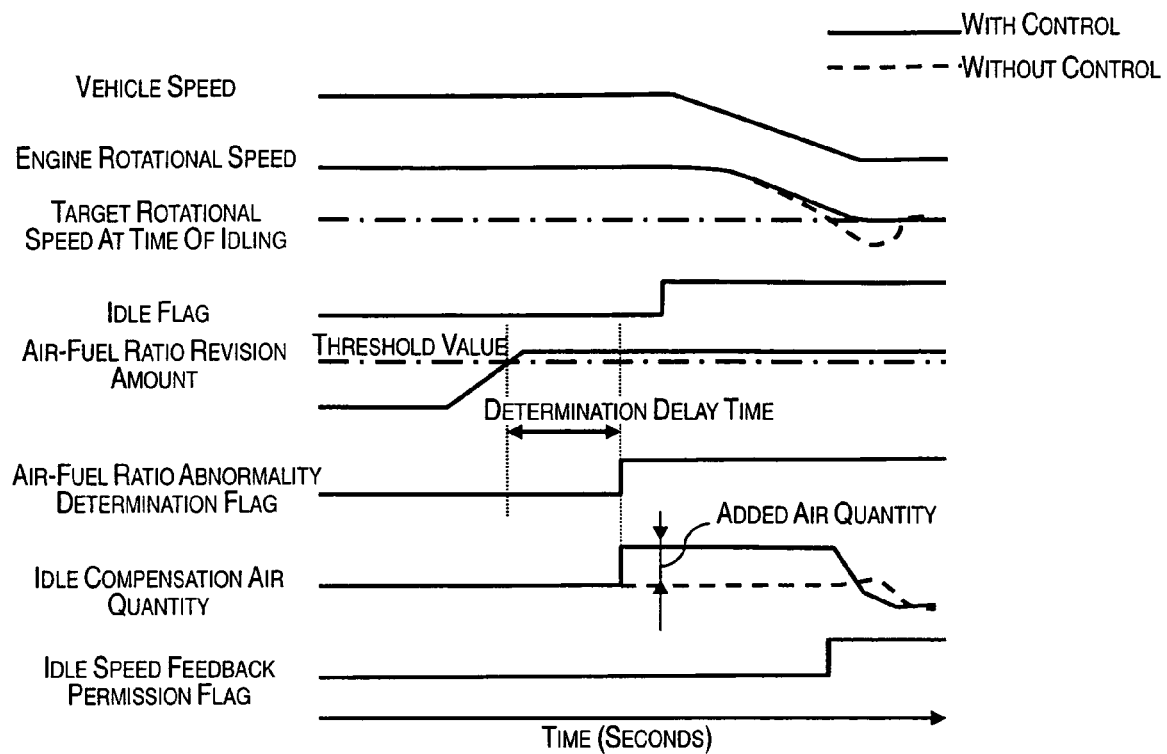
FIG. 3 is a time chart that shows various control characteristics obtained by controlling the intake air quantity using the intake air quantity compensating routine shown in the flowchart of FIG. 2.

If the engine control unit 11 determines in step S14 that the sum of the air-fuel ratio feedback revision coefficient and the air-fuel ratio learning revision value is equal to or above the threshold value, the engine control unit 11 proceeds to step S15 where the engine control unit 11 determines if the sum of the air-fuel ratio feedback revision coefficient and the air-fuel ratio learning revision value has been equal to or above the threshold value continuously for a prescribed amount of time (e.g., 5 seconds) or longer (see FIG. 3). If the sum of the air-fuel ratio feedback revision coefficient and the air-fuel ratio learning revision value has been equal to or above the threshold value continuously for the prescribed amount of time or longer, then the engine control unit 11 determines that the base air-fuel ratio is continuously very lean and that the air-fuel ratio is abnormally lean. Thus, step S15 of the control routine performed by the engine control unit 11 constitutes an abnormally lean air-fuel ratio determining section that is configured to detect if an air-fuel ratio of an internal combustion engine is abnormally lean.

The air-fuel ratio feedback control is suspended when the vehicle is decelerating. Moreover, the progress of the learning process for obtaining the air-fuel ratio learning revision values slows down under the operating conditions that exist when the vehicle is decelerating. Consequently, if the vehicle is decelerated in a manner leading to engine idling while the kind of air-fuel ratio abnormality described in the preceding paragraphs exist, then the engine control unit 11 will not be able to revise the air-fuel ratio at the time of deceleration (i.e., the air-fuel ratio in effect immediately after recovery from the fuel being cut for deceleration) fully to the target air-fuel ratio and the air-fuel ratio will diverge toward leaner values.

The lean air fuel ratio will cause the engine torque to be insufficient and the torque deficiency will cause the rotational speed of the engine 1 to fall faster than the idle speed feedback control can accommodate. In the worst case, this could result in the engine 1 stalling.

If the engine control unit 11 determines in step S15 that the sum of the air-fuel ratio feedback revision coefficient and the air-fuel ratio learning revision value has been equal to or above the threshold value continuously for a prescribed amount of time or longer, then the engine control unit 11 proceeds to step S116 where it increases the intake air quantity of the engine 1 in advance in preparation for possible deceleration of the vehicle (see FIG. 3).

Meanwhile, if the sum of the air-fuel ratio feedback revision coefficient and the air-fuel ratio learning revision value is less than the threshold value, the engine control unit 11 determines that it is unlikely that the air-fuel ratio will diverge greatly to the lean side of the target air-fuel ratio even if the vehicle is decelerated and ends the routine without executing any subsequent steps. Similarly, if the sum is equal to or above the threshold value but has only been so continuously for an amount of time that is less than the prescribed amount of time, then the engine control unit 11 determines that the divergence of the base air-fuel ratio is possibly only temporary and ends the routine without executing step S16.

The revision of the intake air quantity to a larger value executed in step S16 is accomplished by increasing a target air quantity that is used for controlling the throttle value opening degree by a fixed amount (L/min). Thus, step S16 of the control routine performed by the engine control unit 11 constitutes an intake air quantity compensating section that is configured to revise an intake air quantity supplied to the internal combustion engine 1 prior to and during deceleration to a larger quantity upon determining that the air-fuel ratio is abnormally lean.

The target air quantity used for control of the throttle valve opening degree is set by adding an idle compensation air quantity to a target intake air quantity calculated based on the accelerator position and the engine rotational speed. The idle compensation air quantity is calculated based on a required amount corresponding to the air quantity required to achieve the target engine rotational speed, a required amount corresponding to the air quantity required to overcome friction (the friction being determined based on the coolant temperature and other factors), a required amount corresponding to the air quantity required to satisfy the load requirements of the air conditioner and other auxiliary devices, and a feedback revision amount for controlling the engine speed to a target idle speed when the conditions for feedback control are satisfied.

When the engine control unit 11 proceeds to step S16, the engine control unit 11 increases the intake air quantity in comparison with what the intake air quantity would be if the air-fuel ratio were normal by adding a fixed air-fuel ratio abnormality compensation quantity to the target intake air quantity.

Although it is not necessary to increase the intake air quantity when the vehicle is not decelerated in a manner that will lead to engine idling, the intake air quantity is increased in advance in preparation for deceleration of the vehicle because the response would not be fast enough to prevent the engine rotational speed from declining abnormally if the intake air quantity were revised after deceleration of the vehicle was detected.

If the vehicle is decelerated after the intake air quantity has been increased, even if the air-fuel ratio becomes lean, the increase in the engine torque resulting from the increased intake air quantity will compensate for the decrease in engine torque resulting from the shift to a leaner air-fuel ratio. Consequently, the engine rotational speed can be prevented from falling to an abnormal degree when the vehicle is decelerated and the occurrence of engine stalling can be avoided.

Additionally, since the intake air quantity is only increased when the air-fuel ratio has been determined to be abnormal, the intake air quantity is not increased unnecessarily when the air-fuel ratio is normal. Thus, degradation of the fuel efficiency resulting from unnecessarily increasing the intake air quantity can be avoided.

It is also acceptable to configure the control device to revise the feedback revision amount (integral amount) by an amount equal to the air-fuel ratio abnormality compensation quantity and vary (increase or decrease) the air-fuel ratio abnormality compensation quantity in accordance with the difference between the target idle speed and the actual idle speed. By adopting such a configuration, the intake air quantity can be varied smoothly such that, if deceleration leading to idling occurs, the engine rotational speed will not rise sharply before target idle speed is reached.

Preferably, the engine control unit 11 is configured and programmed such that if it is detected that the air-fuel ratio is abnormal even once during a trip (i.e., during the period from when the ignition switch is turned ON until it is turned OFF), the engine 1 will be operated continuously from then on in a state in which the intake air quantity is revised to a larger quantity based on the air-fuel ratio abnormality compensation quantity. When the engine 1 is restarted, it is operated in a state in which the intake air quantity is not revised to a larger quantity based on the air-fuel ratio abnormality compensation quantity.

In order to increase the resistance to engine stalling, it is also acceptable to configure the control device to revise the target idle speed to a higher rotational speed and/or revise the deceleration fuel cut recovery rotational speed (i.e., the engine rotational speed at which fuel injection is resumed) to a higher rotational speed when it detects that the air-fuel ratio is abnormal.

Additionally, in a system having an idle control valve provided in a bypass passage configured to bypass the throttle valve, it is acceptable to configure the control device to increase the intake air quantity supplied to the engine 1 by the idle control value when it detects that the air-fuel ratio is abnormal.

Also, in a system that does not execute learning and store air-fuel ratio learning revision values, abnormality of the air-fuel ratio can be detected based solely on the air-fuel ratio feedback revision coefficient.

Instead of using the oxygen sensor 22 that indicates richness or leanness as the means of detecting the air-fuel ratio, it is also acceptable to use the air-fuel ratio sensor 32 that can detect a wide range of air-fuel ratios. When the air-fuel ratio sensor 32 is provided, the divergence of the air-fuel ratio from the target air-fuel ratio can be measured directly. As a result, the intake air quantity can be revised (increased) by an appropriate quantity based on the amount of divergence of the air-fuel ratio.

FIG. 4 is a flowchart showing the control processing steps for detecting if the air-fuel ratio is abnormal and revising (increasing) the intake air quantity in a case in which the air-fuel ratio sensor 32 is used for detecting the air-fuel ratio.

In step S21 of the flowchart shown in FIG. 4, the engine control unit 11 is configured and programmed to read in various signals the sensors 14–18 as well as the signal outputted from the air-fuel ratio sensor 32. Steps S22 and S23 are the same as steps S12 and S13 of the flowchart shown in FIG. 2.

In step S24, the engine control unit 11 is configured and programmed to determine if the difference between the air-fuel ratio detected by the air-fuel ratio sensor 32 and the target air-fuel ratio is equal to or above a threshold value, i.e., if the actual air-fuel ratio is leaner than the target air-fuel ratio by a prescribed amount or more. This difference indicates the amount by which the fuel injection quantity needs to be revised. Thus, step S24 of the control routine performed by the engine control unit 11 constitutes a fuel injection quantity revising section that revises the fuel injection quantity such that a detected air-fuel ratio of the internal combustion engine matches a target air-fuel ratio.

If the difference between the air-fuel ratio detected by the air-fuel ratio sensor 32 and the target air-fuel ratio is equal to or above the threshold value, then the engine control unit 11 proceeds to step S25 where the engine control unit 11 determines if the difference has been equal to or above the threshold value continuously for a prescribed amount of time or longer. Thus, step S25 of the control routine performed by the engine control unit 11 constitutes an abnormally lean air-fuel ratio determining section that is configured to detect if an air-fuel ratio of an internal combustion engine is abnormally lean.

If the difference has been equal to or above the threshold value continuously for a prescribed amount of time or longer, the engine control unit 11 determines that the air-fuel ratio is abnormal and proceeds to step S26.

A state in which the difference has been equal to or above the threshold value continuously for a prescribed amount of time or longer is a state in which the actual air fuel ratio cannot be corrected to the target air-fuel ratio by means of air-fuel ratio revision (i.e., feedback revision and/or learning revision) and the actual air-fuel ratio is leaner than the target air-fuel ratio. If the vehicle is decelerated in a manner leading to engine idling while the engine is operating in such a state, the engine rotational speed could possibly become abnormally low due to insufficient engine torque.

In step S26, the engine control unit 11 is configured and programmed to revise the intake air quantity of the engine 1 to a larger quantity by setting the air-fuel ratio abnormality compensation quantity in a variable manner based on the difference between the detected air-fuel ratio and the target air-fuel ratio. Thus, step S16 of the control routine performed by the engine control unit 11 constitutes an intake air quantity compensating section that is configured to revise an intake air quantity supplied to the internal combustion engine 1 prior to and during deceleration to a larger quantity upon determining that the air-fuel ratio is abnormally lean.

Figure 5:
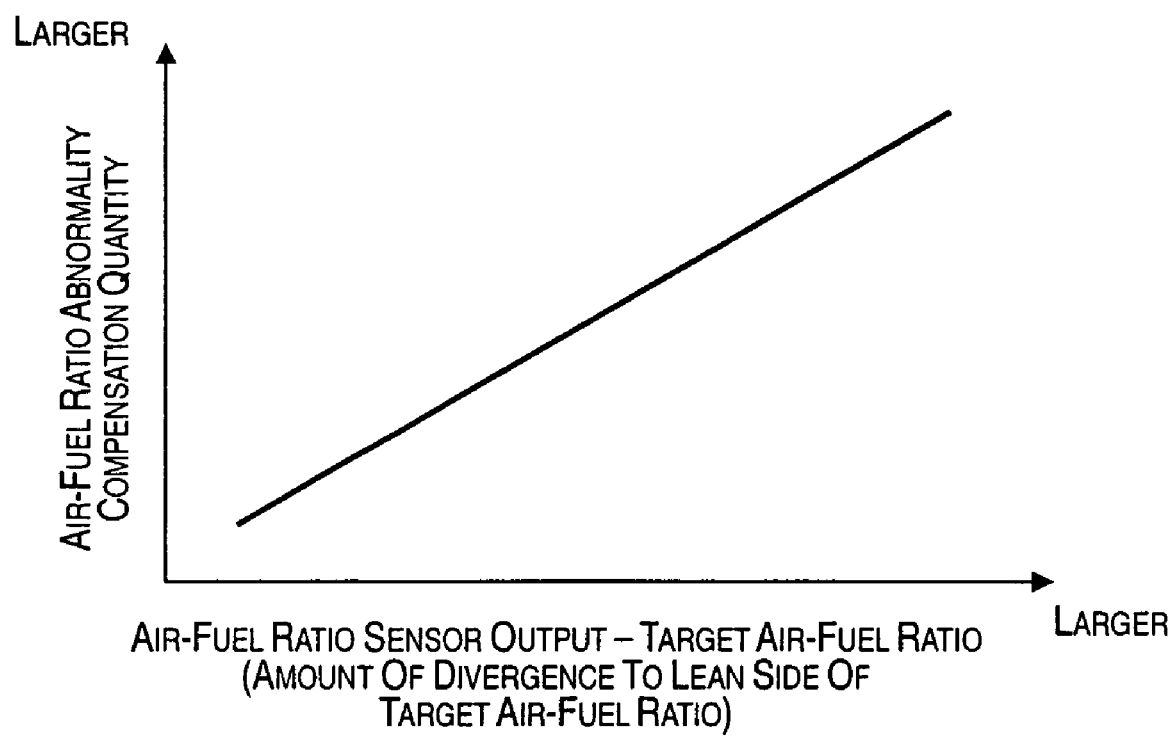
FIG. 5 is a plot showing a characteristic curve of the air-fuel ratio abnormality compensation quantity obtained by controlling the intake air quantity using the intake air quantity compensating routine shown in the flowchart of FIG. 4.

More specifically, as shown in FIG. 5, the air-fuel ratio abnormality compensation quantity is set in such a manner that its value increases as the difference between the detected air-fuel ratio and the target air-fuel ratio increases. In other words, the larger the divergence of the actual air-fuel ratio from the target is, the larger the value to which the air-fuel ratio abnormality compensation quantity is set. As the air-fuel ratio becomes leaner, the size of the resulting torque deficiency increases and the amount by which the intake air quantity needs to be increased in order to compensate for the torque deficiency increases.

By setting the air-fuel ratio abnormality compensation quantity in such a manner that it varies in accordance with the amount by which the air-fuel ratio has deviated to the lean side of the target air-fuel ratio, the intake air quantity can be increased by an amount that is just enough to compensate for the torque deficiency caused by the lean air-fuel ratio. As a result, the resistance to engine stalling can be increased and the response speed with which the engine rotational speed converges to the target idle speed can be maintained.

Although in the embodiment shown in the flowchart of FIG. 2, it is possible to vary the air-fuel ratio abnormality compensation quantity in accordance with the sum of the air-fuel ratio feedback revision coefficient and the air-fuel ratio learning revision value, but the precision with which the air-fuel ratio abnormality compensation quantity is set will be lower than a case in which the air-fuel ratio sensor 32 is used.

Abnormality of the air-fuel ratio can also be detected based on an air-fuel ratio learning revision value and an air-fuel ratio feedback revision coefficient set in accordance with the air-fuel ratio detected by the air-fuel ratio sensor 32.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An internal combustion engine control device comprising:
   an abnormally lean air-fuel ratio determining section configured to detect if an air-fuel ratio of an internal combustion engine is unexpectedly abnormal; and
   an intake air quantity compensating section configured to revise an intake air quantity supplied to the internal combustion engine during deceleration to a larger quantity upon determining that the air-fuel ratio is unexpectedly abnormal.

2. The internal combustion engine control device recited in claim 1, further comprising
   a fuel injection quantity revising section configured to revise the fuel injection quantity such that a detected air-fuel ratio of the internal combustion engine matches a target air-fuel ratio; and
   the abnormally lean air-fuel ratio determining section being further configured to detect if the air-fuel ratio is unexpectedly abnormal based on an amount by which the fuel injection quantity needs to be revised to match the target air-fuel ratio.

3. The internal combustion engine control device recited in claim 2, further comprising
   a sensor configured and arranged to detect an operating condition of the internal combustion engine that is indicative of the air-fuel ratio of the internal combustion engine; and
   the abnormally lean air-fuel ratio determining section being further configured to detect if the air-fuel ratio is unexpectedly abnormal based on a difference between a target air-fuel ratio and the air-fuel ratio determined based on the operating condition detected by the sensor.

4. The internal combustion engine control device recited in claim 3, wherein
   the sensor is an air-fuel ratio sensor that is configured and arranged to detect the air-fuel ratio of the internal combustion engine.

5. The internal combustion engine control device recited in claim 4, wherein
   the intake air quantity compensating section is further configured to set an air-fuel ratio abnormality compensation quantity for increasing the intake air quantity supplied to the internal combustion engine by an amount that varies based on the difference between the target air-fuel ratio and the air-fuel ratio.

6. The internal combustion engine control device recited in claim 5, wherein
   the intake air quantity compensating section is further configured to revise the intake air quantity to a larger quantity upon determining the air-fuel ratio remains in an abnormally lean state for at least a prescribed amount of time.

7. The internal combustion engine control device recited in claim 2, wherein
   the intake air quantity compensating section is further configured to revise the intake air quantity to a larger quantity upon determining the air-fuel ratio remains in an abnormally lean state for at least a prescribed amount of time.

8. The internal combustion engine control device recited in claim 1, further comprising
   an air-fuel ratio sensor configured and arranged to detect the air-fuel ratio of the internal combustion engine; and
   the abnormally lean air-fuel ratio determining section being further configured to detect if the air-fuel ratio is unexpectedly abnormal based on a difference between a target air-fuel ratio and the air-fuel ratio detected by the air-fuel ratio sensor.

9. The internal combustion engine control device recited in claim 8, wherein
   the intake air quantity compensating section is further configured to set an air-fuel ratio abnormality compensation quantity for increasing the intake air quantity supplied to the internal combustion engine by an amount that varies based on the difference between the target air-fuel ratio and the air-fuel ratio.

10. The internal combustion engine control device recited in claim 9, wherein
    the intake air quantity compensating section is further configured to revise the intake air quantity to a larger quantity upon determining the air-fuel ratio remains in an abnormally lean state for at least a prescribed amount of time.

11. The internal combustion engine control device recited in claim 8, wherein
    the intake air quantity compensating section is further configured to revise the intake air quantity to a larger quantity upon determining the air-fuel ratio remains in an abnormally lean state for at least a prescribed amount of time.

12. The internal combustion engine control device recited in claim 1, wherein
    the intake air quantity compensating section is further configured to revise the intake air quantity to a larger quantity upon determining the air-fuel ratio remains in an abnormally lean state for at least a prescribed amount of time.

13. The internal combustion engine control device recited in claim 1, further comprising
    an idle speed feedback control section configured to determine if conditions have been satisfied for idle speed feedback control of the air-fuel ratio; and
    the intake air quantity compensating section being further configured to revise the intake air quantity supplied to the internal combustion engine upon determining the conditions for the idle speed feedback control have not been satisfied.

14. The internal combustion engine control device recited in claim 1, wherein
    the intake air quantity compensating section is further configured to revise the intake air quantity supplied to the internal combustion engine prior to the internal combustion engine reaching an idling speed.

15. An internal combustion engine control device comprising:
    abnormally lean air-fuel ratio determining means for detecting if an air-fuel ratio of an internal combustion engine is unexpectedly and abnormally lean; and
    intake air quantity compensating means for revising an intake air quantity supplied to the internal combustion engine during deceleration to a larger quantity upon determining that the air-fuel ratio is unexpectedly and abnormally lean.

16. A method of controlling an internal combustion engine comprising:

detecting if an air-fuel ratio of the internal combustion engine is unexpectedly and abnormally lean; and revising an intake air quantity supplied to the internal combustion engine during deceleration to a larger quantity upon determining that the air-fuel ratio is unexpectedly and abnormally lean.

\* \* \* \* \*